Feb. 14, 1939.   W. H. FRANK   2,146,813
ELECTRICAL DISTRIBUTION SYSTEM
Filed Aug. 27, 1937

INVENTOR.
William H. Frank
BY Daniel G. Cullen
ATTORNEY.

Patented Feb. 14, 1939

2,146,813

UNITED STATES PATENT OFFICE 2,146,813
ELECTRICAL DISTRIBUTION SYSTEM
William H. Frank, Detroit, Mich.

Application August 27, 1937, Serial No. 161,312

3 Claims. (Cl. 247—3)

This application relates to electrical distribution systems of the character shown in our Patent No. 2,041,675 of May 19, 1936.

More particularly, this application relates to a novel form of branch outlet device including a junction box and a swinging plug hinged thereto.

For an understanding of the details of construction of the branch outlet device hereof, reference will be had to the appended drawing. In this drawing, Fig. 1 is a top plan view of a fragment of duct having the novel branch outlet device hereof mounted hereon;

Figure 1:
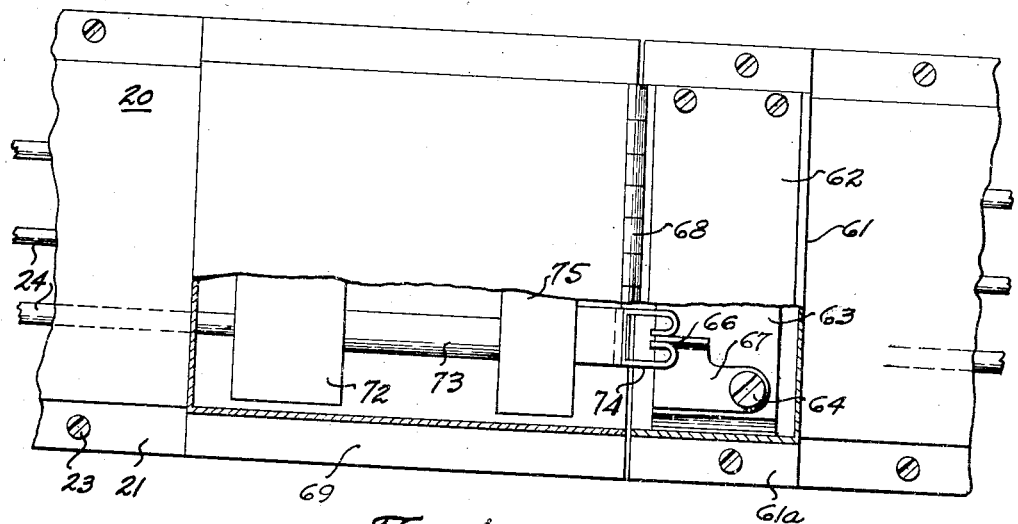
Figure 3:
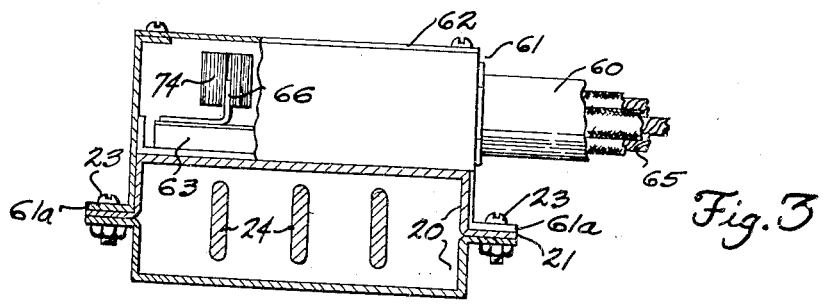
Fig. 3 is a transverse section view.

The duct hereof comprises identical sheet metal casing halves 20 having cooperating longitudinal edge flanges 21 joined by casing joining bolts 23 and containing bus bars 24, access to which may be obtained through suitable entrance holes of the duct.

The branch outlet device hereof, utilized for rigidly securing the end of a branch circuit conduit 60 with respect to the duct, comprises a junction box 61 having flanges 61a adapted to be secured to the duct by suitable ones of the screws 23 and having an open top provided with a removable hand hole cover plate 62. The box 61 is provided with knockouts, a selected one of which may be knocked out to provide a hole to which the end of the conduit 60 may be secured, as by means of a lock nut and bushing. Within the junction box is a block 63 supporting binding posts 64 adapted to secure the terminals of the branch circuit conductors or cables 65 (within the conduit 60) with respect to contacts 66 within the junction box 61. These contacts are electrically connected to the binding posts by suitable connection straps 67.

The end of the box 61 adjacent the contacts 66 is open and on the top of the box at such end there is provided a hinge 68 forming a hinge connection between the box 61 and another flanged box 69 forming part of a swinging plug which comprises not only the box 69 but also bus bar engaging plug prongs 71 mounted on blocks 72 and electrically connected through elongated fuses 73 whose axes are transverse to the axes of the prong 71 to jaw type movable contacts 74 mounted on blocks 75 adjacent the hinged open end of the swing plug, the contacts 74 projecting through such open end.

Figure 2:
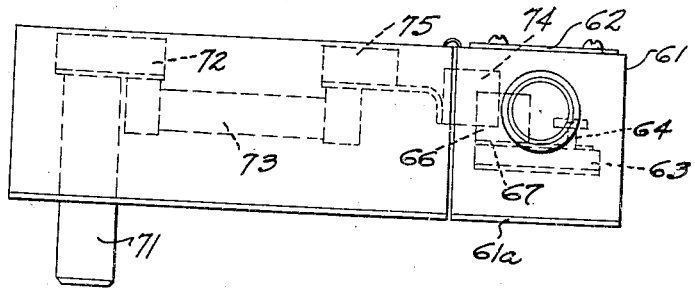
Fig. 2 is a side view of the device per se.

When the parts are in the position of Fig. 2, the movable contacts 74 of the swing plug will make with the stationary contacts 66 of the junction box and the plug prongs 71 will engage the bus bars 24, circuits being established from the bus bars to the cables 65 through the plug prongs 71, the fuses 73, the mating contacts 74—66, and the binding posts 64. When the parts are in such position, the junction box 61 and the swing plug box 69 will be in registered alignment to simulate the appearance of a single elongated box within which are contained all the necessary parts.

When the swing plug is swung open on its hinge 68, the circuits from the bus bars to the binding posts will be broken in two places, first by the disengagement of the prongs from the bus bars and immediately thereafter by the breaking of contacts 74—66.

The plug box 69 may be provided with a suitable handle and a latch means provided respectively for manipulating the plug and for latching it to the duct when the plug is swung into plug-in position.

While in the embodiment indicated by the plug prongs leave the bus bars before the movable contacts 74 leave the stationary contacts 66, it is obvious that the parts may be so designed that the contrary is true, in which case make and break will first occur at the contact sets 74—66 and will later occur at the plug prong-bus bar engagement points.

It will be understood that while but one set of contact parts for the plug is shown, that there will be three sets to correspond to the three bus bars indicated.

Now having described the construction herein disclosed, reference will be had to the claims which follow to determine the protection sought herein.

I claim:

1. In an electrical distribution system, a duct having a bus bar therein and having an entrance for permitting a plug prong to enter the duct and engage the bus bar, means secured to the duct and having a terminal binding post for securing a terminal of a branch conductor with respect to the duct, the conductor entering the means through a hole in the means, the means having a stationary contact connected to the binding post, and a branch plug hinged at one end to the means, and having a movable contact for making with the stationary contact when the plug is in its contact making position, and a plug prong for entering the duct entrance and engaging the bus bar therein, the parts being so designed that when the plug prong is in engagement with the bus bar, the plug contact is in engagement with the stationary contact.

2. In an electrical distribution system, a duct having a bus bar therein and having an entrance for permitting a plug prong to enter the duct and engage the bus bar, means secured to the duct and having a terminal binding post for securing a terminal of a branch conductor with respect to the duct, the conductor entering the means through a hole in the means, the means having a stationary contact connected to the binding post, and a branch plug hinged at one end to the means, and having a movable contact at such end for making with the stationary contact when the plug is in its contact making position, the plug having a plug prong at the other end thereof for entering the duct entrance and engaging the bus bar therein, the parts being so designed that when the plug prong is in engagement with the bus bar, the plug contact is in engagement with the stationary contact.

3. In an electrical distribution system, a duct having a bus bar therein and having an entrance for permitting a plug prong to enter the duct and engage the bus bar, means secured to the duct and having a terminal binding post for securing a terminal conductor of a branch conductor with respect to the duct, the conductor entering the means through a hole in the means, the means having a stationary contact connected to the binding post, and a branch plug hinged at one end to the means, and having a movable contact at such end for making with the stationary contact when the plug is in its contact making position, the plug having a plug prong at the other end thereof for entering the duct entrance and engaging the bus bar therein, the parts being so designed that when the plug prong is in engagement with the bus bar, the plug contact is in engagement with the stationary contact, the means being in the nature of a box, and the plug means being in the nature of a box, the two boxes also being in registered alinement and in end to end engagement when the plug prong is in bus bar engaging position whereby the two boxes simulate the appearance of but one box.

WILLIAM H. FRANK.